(12) United States Patent
Friedlein et al.

(10) Patent No.: US 10,024,459 B1
(45) Date of Patent: Jul. 17, 2018

(54) TILE FEED WHEEL CONTROL

(71) Applicant: Ag Leader Technology, Ames, IA (US)

(72) Inventors: Aaron Friedlein, Ames, IA (US); Ronald L. Farrington, Nevada, IA (US); Corey Weddle, Ames, IA (US)

(73) Assignee: Ag Leader Technology, Inc., Ames, IA (US)

( * ) Notice: Subject to any disclaimer, the term of this patent is extended or adjusted under 35 U.S.C. 154(b) by 51 days.

(21) Appl. No.: 15/090,286

(22) Filed: Apr. 4, 2016

Related U.S. Application Data

(60) Provisional application No. 62/142,219, filed on Apr. 2, 2015.

(51) Int. Cl.

| | | |
|---|---|---|
| *G06F 7/70* | (2006.01) | |
| *G06G 7/00* | (2006.01) | |
| *F16L 1/032* | (2006.01) | |
| *E02F 5/10* | (2006.01) | |
| *E02B 11/02* | (2006.01) | |

(52) U.S. Cl.
CPC ............. *F16L 1/032* (2013.01); *E02B 11/02* (2013.01); *E02F 5/10* (2013.01)

(58) Field of Classification Search
CPC ............................... B65H 15/30; B65H 75/425
See application file for complete search history.

(56) References Cited

U.S. PATENT DOCUMENTS

| | | | | |
|---|---|---|---|---|
| 4,119,157 A | * | 10/1978 | Schuck .................. | E02F 5/103 172/477 |
| 4,244,123 A | | 1/1981 | Lazure et al. | |
| 4,397,585 A | | 8/1983 | Fouss et al. | |
| 4,720,929 A | * | 1/1988 | Umberson ............. | B60K 25/00 192/70.12 |
| 4,736,534 A | * | 4/1988 | Daniels ................. | E01B 27/107 37/104 |

(Continued)

OTHER PUBLICATIONS

Crary Tile Pro Brochure, pp. 1-12. Crary © 2015.

(Continued)

*Primary Examiner* — Bhavesh V Amin
(74) *Attorney, Agent, or Firm* — McKee, Voorhees & Sease, PLC

(57) ABSTRACT

Methods, apparatus, and systems providing enhanced feed rate control of tubing and conduit feeds by a powered feeder to an in-ground placement device moved across the ground by a steerable vehicle. In one aspect, ground speed of the vehicle is sensed. Feed motor speed is correlated to length of tubing or conduit estimated to be fed per feed wheel revolution by the feed motor. A controller adjusts feed motor speed to match ground speed to feed rate. In another aspect, instead of estimating feed rate by feed wheel rotation, actual speed of movement of the tubing or conduit is sensed. Feed motor speed is automatically and dynamically adjusted to match ground speed to tubing or conduit speed. In either embodiment, sensing of ground speed can be used to sense starting and stopping of the vehicle. This can be used to turn the feed motor on or off. In either embodiment, integration with a precision agriculture intelligent controller can allow operator control right from the precision ag display.

24 Claims, 15 Drawing Sheets

(56) References Cited

U.S. PATENT DOCUMENTS

| | | | | | |
|---|---|---|---|---|---|
| 4,784,524 | A | * | 11/1988 | Stine | E02F 5/14 172/466 |
| 4,920,680 | A | * | 5/1990 | Lindgren | A01K 91/18 254/362 |
| 5,139,751 | A | * | 8/1992 | Mansfield | B05B 13/06 118/306 |
| 5,558,465 | A | * | 9/1996 | Pecot | E02F 5/102 254/134.4 |
| 6,119,837 | A | * | 9/2000 | Tschurbanoff | B65H 75/425 191/12.2 A |
| 6,193,440 | B1 | * | 2/2001 | Pidgeon | E02F 5/06 37/106 |
| 6,299,381 | B1 | * | 10/2001 | Liebrecht, Jr. | E02F 3/06 37/350 |
| 7,331,436 | B1 | * | 2/2008 | Pack | B65H 75/425 191/12.2 A |
| 8,814,474 | B2 | | 8/2014 | Bell | |
| 9,708,791 | B2 | * | 7/2017 | Strutynsky | E02F 3/9231 |
| 2005/0109870 | A1 | * | 5/2005 | Krise | B60P 1/6463 242/557 |
| 2006/0071116 | A1 | * | 4/2006 | Quenneville | B65H 75/425 242/557 |
| 2011/0184597 | A1 | * | 7/2011 | Thomas | B60L 9/00 701/22 |
| 2012/0328372 | A1 | * | 12/2012 | Hawkes | B63C 11/34 405/177 |
| 2013/0146700 | A1 | * | 6/2013 | Wigard | B65H 75/425 242/407 |
| 2015/0028146 | A1 | * | 1/2015 | Tsukui | H02G 11/02 242/390.9 |
| 2017/0217715 | A1 | * | 8/2017 | Scott | B65H 51/30 |

OTHER PUBLICATIONS

Raven Precision 5 GPM PWM Hydraulic Control Valve, http://www.spraysmarter.com, pp. 1-4, downloaded Mar. 31, 2016.

OPTO 22 RPM Measurement Techniques, Technical Note, FORM 1784-130305, pp. 1-4. © 2013.

Tile Pro PF-100 Tile Feeder Brochure, Crary Agricultural Solutions, LLC, pp. 1-4. Oct. 2013.

* cited by examiner

TILE FEED WHEEL CONTROL

CROSS-REFERENCE TO RELATED APPLICATIONS

This application claims the benefit under 35 USC 119 or 120 to provisional U.S. Ser. No. 62/142,219, filed Apr. 2, 2015, which is incorporated by reference herein in its entirety.

BACKGROUND OF THE INVENTION

A. Field of the Invention

The present invention relates to methods and apparatus for laying flexible tubing or other conduit in the ground and, in particular, to controlling rate of feed of the tubing or conduit.

B. Problems in the Art

Use of a plow or knife apparatus to form a slot in the ground, and a boot behind the plow or knife to guide tubing or conduit into the slot, is a long-established technique of laying such things as drainage tile or other conduits subsurface in the ground, One example of this technique from the prior art is shown at FIG. 1. Taken from U.S. Pat. No. 4,397,585, which is incorporated by reference herein, a plow A with a guiding boot B attached behind it is dragged though the ground by a motive force C (here diagrammatically a tracked vehicle). A starting supply or reel of flexible tubing D can be carried on vehicle C and directed into boot B. As tractor C moves along the ground, tubing D is released or drawn from the reel and deposited along the slot in the ground. Once the reel of tubing D is exhausted, a new reel is installed on tractor C, the distal end of tubing D threaded into and through boot B, and the process can continue.

Another example of a plow/boot type system is illustrated in FIG. 2. Taken from U.S. Pat. No. 8,814,474, it likewise uses a tractor 11 to pull a plow 20 through the ground. A boot 30 on the backside of plow 20 receives and guides flexible conduit 18 along the ground. In this example, the supply of conduit 18 is from a reel shown on a separate vehicle (here truck 13). Truck 13 is typically driven laterally alongside and generally in parallel to tractor 13 to provide a steady supply of conduit 18. When a reel of tubing or conduit is exhausted, a new reel must be loaded on truck 13 and threaded into boot 30 of plow 20.

Some present systems utilize what can be called a power feeder for the tubing or conduit. As illustrated diagrammatically in FIG. 2, power feeder 40 is mounted by a bracket or other mount 41 (shown diagrammatically) on plow 20. Tubing 18 is threaded between a driven tile feed wheel 42 and an opposite non-driven tile feed wheel 49, both of which are in contact with the exterior of tubing 18. A motor 44 rotates driven wheel 42 in the appropriate direction to pull tubing 18 from its reel, and force tubing 18 through boot 30.

Tile feed wheels are typically a small tire (like ones used on a garden tractor) that is used to lift drainage tile into the boot of the tile plow. The tire is generally spring loaded to have some pressure on it from the tire and the guide going into the boot. Different companies use different approaches, to moderate the speed of the feed wheels.

A Soil-Max™ (Soil-Max, Brazil, Ind., USA) brand commercially-available tile plow has, as an optional attachment, a powered tile feeder which uses a switchbox that has an on/off switch, as well as a rotary dial that is used to adjust to the speed of rotation of the tire. See U.S. Pat. No. 8,814,474 to Dennis Bell and assigned to Soil-Max, Inc., incorporated by reference herein, for details regarding laying of tile pipe with a tile plow. The Soil-Max feeder uses a hydraulic motor to rotate a lower pneumatic rubber tread tire, and an upper steel wheel or rim (non-driven) to guide and clamp the tile tubing to the driven wheel. Another powered tile feeder is commercially available from Crary Agricultural Solutions, LLC under the model Tile Pro PF-100 Tile feeder. It is similar, but uses pneumatic rubber tread tires on top and bottom.

Other brands of powered tile feeders simply have a single speed system, where the wheel turns faster than needed.

If a tile feed wheel is left to spin when tractor has stopped, the plastic tile can be damaged, or worn thin where the tire was spinning on it. When the tile is worn thin, this causes potential for water pressure inside the tile to push out the thin spot and create a "blow out" were the water pushes up to the soil surface, and creates a hole, as well as erosion of soil into the tile once the pressure drops. This requires the grower to dig the tile up, and repair the damaged section of tile, and re-bury it.

Even with an on/off switch and rotary dial for the operator to adjust feed motor speed, as with the above-mentioned Soil-Max feeder, it requires constant monitoring and manual manipulation by the operator. This can distract from other crucial operator tasks. For example, at least in the case of laying drainage tile, the operator must carefully and constantly watch that appropriate grade and depth are maintained.

Therefore, it could be advantageous to have the feed tire automatically start/stop with the forward motion of the tile plow, to deter or prevent this damage. Alternatively, when starting to install drainage pipe, the tire could start to automatically pull tile in as soon as forward motion is sensed (e.g. by GPS).

Additionally, it could be beneficial to provide more automatic control over the rate of feed during the laying of tubing or conduit. Merely allowing the operator to adjust the feed rate, such as by manual adjustment of feed motor control, relies on operator skill and estimation. It likewise takes the operator's attention away from other crucial tasks.

Precision agriculture systems enable the operator to gather information about a field as well as monitor activity and operation of implements and their functions. Typically they include a display (a human-machine interface) at the operator. Many times they are installed in a tractor or other agricultural vehicle. Examples include InCommand™ and Compass™ systems commercially available from Ag Leader Technology, Ames, Iowa USA. Such systems, and their ability to tie-in to, communicate with, control, and/or monitor actuators, sensors, and other components are well-known in the art.

Tile feed wheel control, for example from a precision ag display (on/off or feed motor speed), could deter or eliminate the above-identified problems.

SUMMARY OF THE INVENTION

A. Objects, Features, Aspects, and Advantages of the Invention

The idea behind the invention is to control the speed of rotation of the powered feed tire with the ground speed while tiling. The ground speed would be sourced from, in one example, a GPS antenna associated with the equipment. This would also serve as the on/off for the tile feed system. If a tile feeder is left to spin when tile installation has stopped, the plastic tile can be damaged, or worn thin where the tire was freewheel spinning on it. So by having the tire start/stop with the motion of the tile plow, this prevents this damage.

In one aspect of the invention, rate of feed is matched to ground speed by calibrating the amount of tubing or tiling that would be advanced by the feed wheel per revolution. Knowing the diameter of the feed wheel, it is a straightforward mathematical calculation. The circumference of the feed wheel would be assumed to equal the length of the tubing or conduit the wheel would advance. The speed of the motor could be monitored and fed back to a controller which would calculate the appropriate motor speed to provide the length of tubing or conduit to be fed to the plow to match the ground speed of the plow. In this way, all that is needed is a source of ground speed, a motor speed sensor at the feed motor, and a controller program to process these inputs into a control signal to modulate the motor speed.

In another aspect of the invention, rate of feed is matched to ground speed by actually measuring the movement and speed of the tubing or conduit as it is fed to the plow boot. A sensor is placed along the path of the tubing or conduit from which movement and speed of the tubing or conduit can be derived. This measurement can then be compared with ground speed. Any offset can be used to speed up or slow down the feed motor proportionally. This technique can avoid inaccuracies caused by feed wheel slippage. There are a variety of sensors that can provide tubing or conduit actual movement and speed. Some are non-contact such as optoelectrical or optoelectronic. Others are electromechanical. In this way, a ground speed source and a tubing or conduit velocity sensor are the inputs to a controller which can be used to instruct operation of the feed motor.

In any of these aspects, the monitoring of ground speed and rate of feed allows enhanced control. In one example, it might simply be to automatically ensure that the feed motor/wheel is turned off when the plow is stopped. In another example, automatic and dynamic adjustment of the feed motor/wheel to match ground speed can allow the operator more focus on other tasks.

The invention can be implemented in a variety of forms. It also can be combined with other components. One example is combination with a precision agriculture type system. The operator could make selections right from the operator display, such as manually turning the feed motor on or off, or selecting automatic mode. The feed wheel control can be integrated with other precision ag functions, including but not limited to geospatial mapping of the placement of the tubing or conduit, data about that placement, preserving and allowing recall and display of such information locally, or communicating the data to remote computers or cloud-based applications.

It is therefore a principal object, features, aspect or advantage of the present invention to improve over or solve problems or deficiencies in the state of the art.

Other objects, features, aspects, or advantages of the present invention relate to an apparatus or method which:

a. Deters damage to the tile from a power feeder.

b. Allows a user to focus attention on other things, including vehicle path and grade of plow, particular in start/stop events.

c. Can compensate for such things as kinks or delays in providing tubing or conduit to the boot of the plow.

d. Can provide semi-automatic or automatic dynamic control of feed rate.

e. Can be integrated with other systems, including but not limited to on-board precision agriculture systems.

f. In one aspect, can compensate for possible inaccuracies by measuring actual movement and speed of the tubing or conduit as it is being feed.

g. Is relatively economical and does not interfere with the components needed for the power feeding of tubing or conduit.

B. Aspects of the Invention

According to one aspect of the invention, a method of controlling a powered feeding of flexible drainage tubing or other conduit for in-ground placement comprises (a) monitoring movement or speed related to the placement of the tubing or conduit in the ground; and (b) controlling rate of the powered feeding of the tubing or conduit based on the monitored movement or speed. In one implementation, the in-ground placement is with a plow and boot moved by a motive force along the ground.

One version of the method monitors movement or speed of the plow and boot along the ground. One non-limiting way to do so is with GPS. The movement or speed of the plow/boot can be compared to the rate of feeding of the tubing or conduit by the power feeder. Knowing the diameter of the feed wheel allows estimation of what length of tubing or conduit would be advanced per wheel revolution. The speed of the motor that rotates the feed wheel controls feeding rate. Motor speed can therefore be automatically adjusted to match ground-speed of the tractor/plow/boot. Moreover, when movement of the tractor/plow/boot is sensed as being stopped or started, the method can use this to stop or start powered feeding of the tubing or conduit.

An alternative to matching ground speed to feed wheel motor speed is to monitor actual speed of movement of the tubing or conduit. Non-limiting examples are optoelectronic (such as a non-contact laser Doppler velocimeter) or electromechanical (such as a contact wheel with encoder to measure rotational speed of the contact wheel). The derived measurement of movement or speed of the tubing or conduit itself can be used in similar ways to the first version and avoids inaccuracies caused by feed wheel slippage relative the tubing or conduit are avoided. For example, stoppage of movement of the plow/boot, as measured by a sensor (e.g. GPS) could be used to stop movement of the tubing or conduit (and conversely changing from plow stopped to plow moving cause start of tubing or conduit powered feeding). But moreover, by comparing actual speed of the tubing or conduit to the ground speed, the method could automatically match the two or keep the two in proportion to one another. This could reduce stress on the elongated tubing or conduit by promoting correspondence between rate of feed and operation of the feed motor. For example, if kinks or slack develops in the tubing or conduit, the method compensates automatically and dynamically. This promotes correct deposit of the tubing or conduit in the ground and deters stress or damage on it. Monitoring rate of feeding over time can also allow automatically estimating and signaling the operator when a reel of tubing or conduit is about to be exhausted.

Another aspect of the invention monitoring movement or speed related to the placement of tubing or conduit also allows interfacing with other systems. One example is a precision agriculture intelligent control or display. Such things as maps or other data can be compiled to show, inter alia, where tubing or conduit has been placed. This can be utilized in conjunction with other precision farming functions, such as yield monitoring, planning, or analysis. This type of data and functions can also be communicated to remote computers or storage, such as via the internet or to cloud storage or computing.

Another aspect of the invention comprises an apparatus for controlling a powered feeding of flexible drainage tubing or other conduits system for in-ground placement. A plow and boot apparatus is operably connected to a steerable vehicle to move the plow apparatus relative to a ground area. A power feeder feeds the tubing or conduit from a bulk quantity to an inlet to the boot of the plow apparatus, the power feeder comprising a motor-driven wheel. A sensor senses ground speed of the vehicle or plow. A sensor senses a parameter related to rate of movement or speed of the tubing or conduit. This can be indirectly by sensing motor speed (e.g. motor shaft rpm sensor). By assuming one rotation of the feed wheel would advance a corresponding length of tubing or conduit, motor speed can be correlated to rate of feed. Alternatively, this can be more directly, by measuring speed of movement of the tubing or conduit itself (e.g. non-contact or contact velocimetry). This avoids inaccuracies from feed wheel slip. A controller operably connected to the sensors and the motor of the power feeder is adapted to sense the rate of feeding of the tubing or conduit to the boot of the plow apparatus based on the sensed parameter related to movement or speed. The parameter related to movement or speed can be matched to sensed ground speed to dynamically control rate of feeding.

The apparatus can include controls for different states or functions. For example, a manual control could allow bypass or override for user shut-off of the power feeder. Another example is a manual selector control for selecting direction of rotation of feeder motor, on/off, or automatic operation. Others include matching speed of the feeder wheel to ground speed; a setting to allow a user to add a gain value so that the feed wheel does not cause drag on the tubing or conduit; or a setting for wheel slip factor to increase feeder wheel speed. Others are possible. The apparatus can include a programmable controller. The controller can be stand-alone or communicated with such things as a precision agricultural display and intelligent device, a remote computer, the internet, or the cloud.

Another aspect of the invention comprises a system for controlling a powered feeding of flexible drainage tubing or other conduit for in-ground placement including (a) a plow and boot sub-system for opening a slot in the ground and guiding the tubing or conduit into the slot; (b) a power feeder sub-system for feeding the tubing or conduit to the boot; (c) a control sub-system for controlling rate of power feeding of the tubing or conduit to the boot. The control sub-system, in one embodiment, can include a sensor for sensing a parameter related to movement or speed of (1) the plow and boot sub-system relative the ground; and (2) rate of feed of the tubing or conduit relative the boot. Rate of feed can be indirect, by monitoring feed motor rpm, or direct. An electronic controller programmable to instruct rate of feeding by the power feeder sub-system based on the sensed parameter. The system could be used in combination with a precision ag display, a tractor, and a supply of tubing or conduit.

DETAILED DESCRIPTION OF EXEMPLARY EMBODIMENTS OF THE INVENTION

A. Overview

Figure 1:
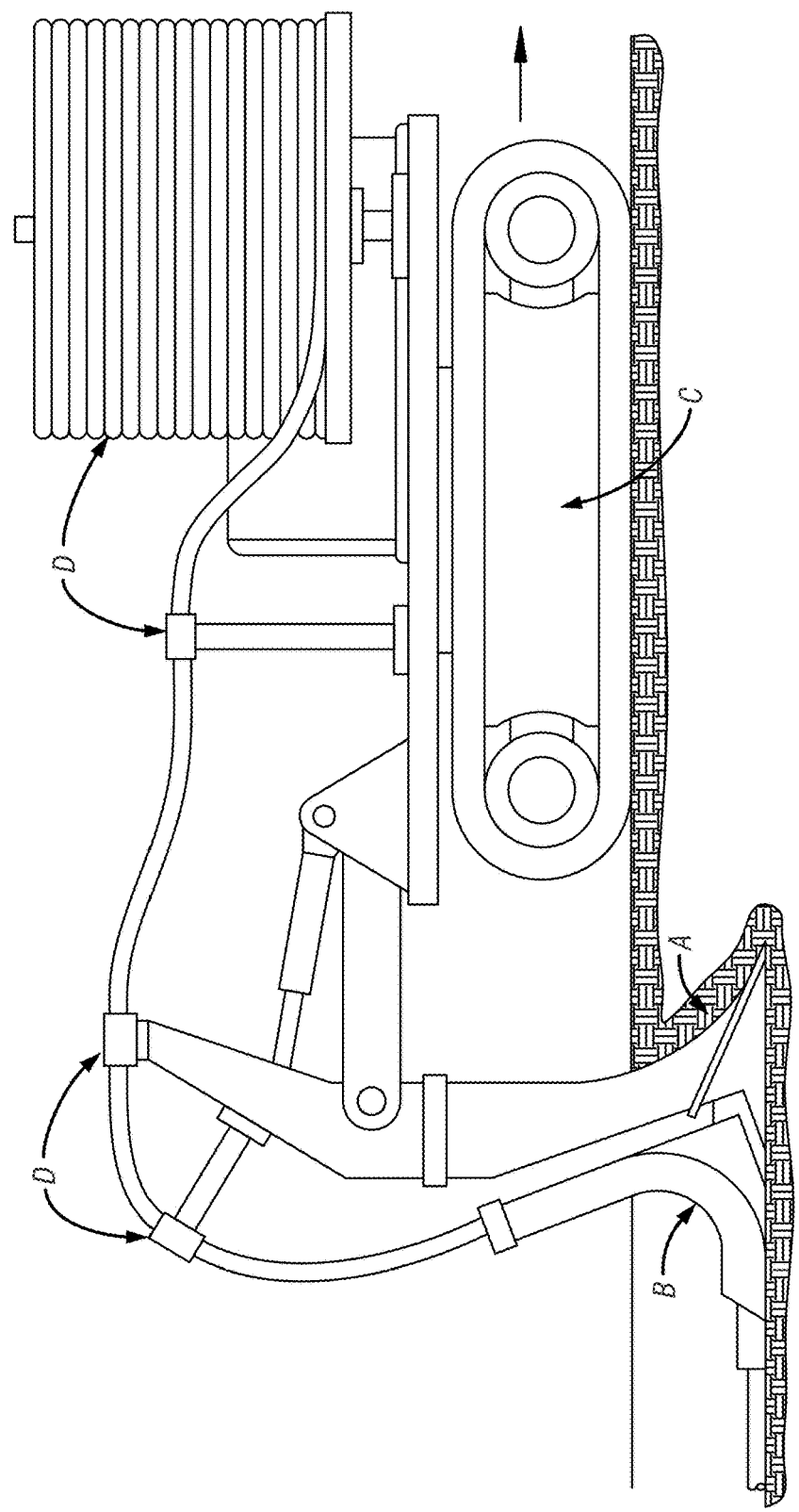
FIG. 1 is an illustration of a prior art tubing or conduit laying system.
Figure 2:
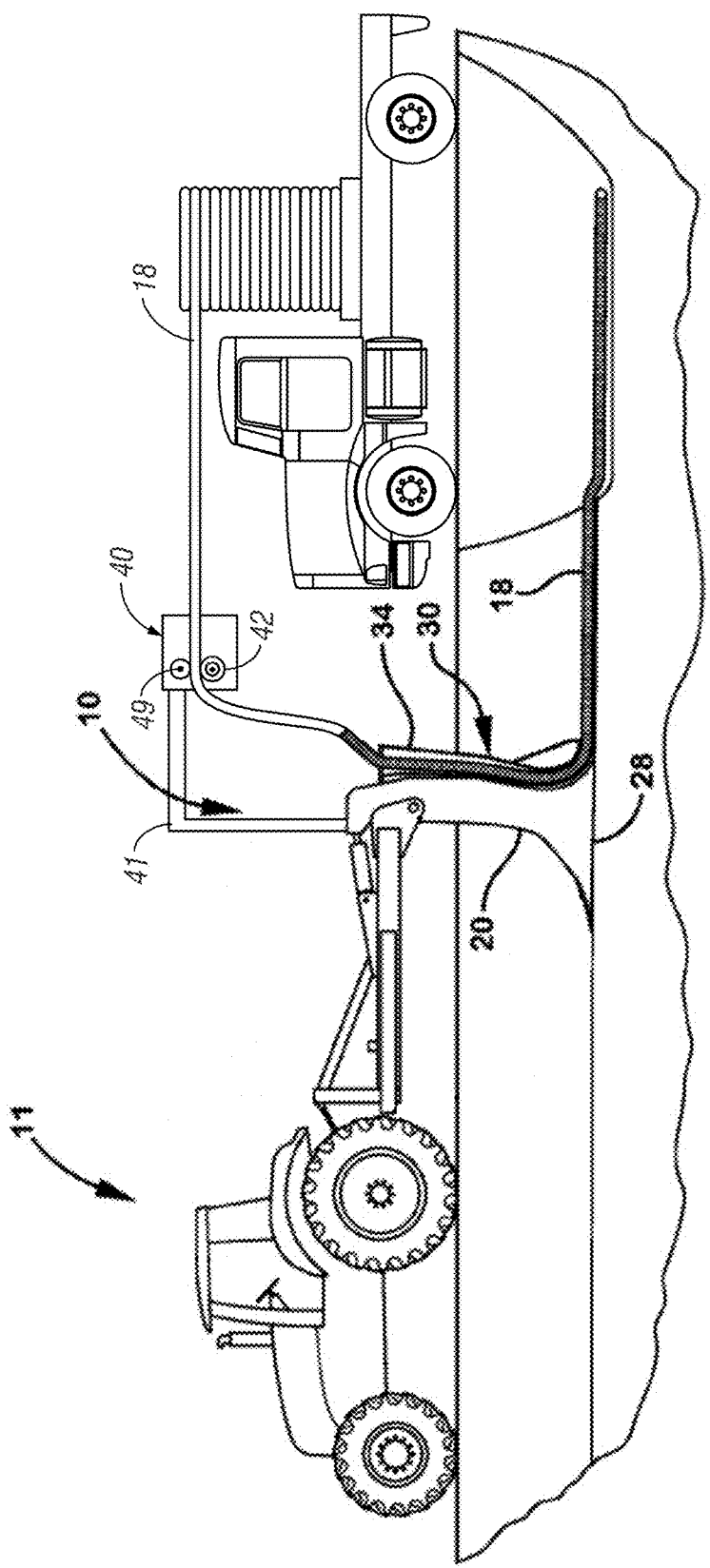
FIG. 2 is an illustration of another prior art tubing or conduit laying system, including a powered feeder having feeder wheels.

For a better understanding of the invention, several examples of forms or embodiments the invention can take will now be described in detail. It is to be understood, however, that these examples are neither inclusive nor exclusive of all forms and embodiments the invention can take. Variations obvious to those skilled in the art will be included within the invention.

The exemplary embodiments focus on installation of flexible drainage tile pipe or tubing in the ground. Such tile is well-known in the art. U.S. Pat. Nos. 4,397,585 and 8,814,474 discussed above and incorporated by reference, provide additional details. It is to be understood, however, that the invention is not necessarily limited to installation of this type of product and can be applied to other types of tubing or conduit in analogous ways.

Similarly, a number of power feeders are commercially available. Several have been discussed above. Each utilizes at least one driven wheel to contact frictionally attempt to advance tubing or conduit from a bulk supply to the boot.

Those skilled in the art are familiar with these systems and therefore further detail will not be given here.

As will be appreciated by those skilled in the art, the invention can be implemented in a variety of different ways. This includes a variety of different commercially available components. Examples include GPS systems and antenna, shaft sensors and encoders, contact and non-contact velocimeters, digital programmable controllers, hydraulic motors and controls, and manual or digital human-machine interfaces. The designer can select such components based on needed function. Communication between the components is within the skill of those this skilled in the art. Therefore, the embodiments will be illustrated in highly diagrammatical fashion with frequent reference to the drawings.

B. Apparatus

1. Embodiment 1

A first exemplary embodiment is illustrated in FIGS. 3A-3D. The control of flexible drainage tile 18 from bulk source on truck 13 is through powered feeder unit 40. Feeder 40 can be mounted by any number of mount types 41 to plow 20 or otherwise. Examples are metal arms or brackets.

Typically, truck 13 would be lateral to plow 20 and feeder wheels 42 and 49 perpendicular to the direction of travel of tractor 11 and plow 20. FIG. 1 shows them parallel for illustration purposes only.

Additionally, the scale of power feeder 40 is not actual scale in FIG. 1 for clarity. It diagrammatically shows how driven feed wheel 42 and non-driven wheel 49 are on opposite sides of pipe 18 and direct pipe 18 to boot 30.

Figure 3A:
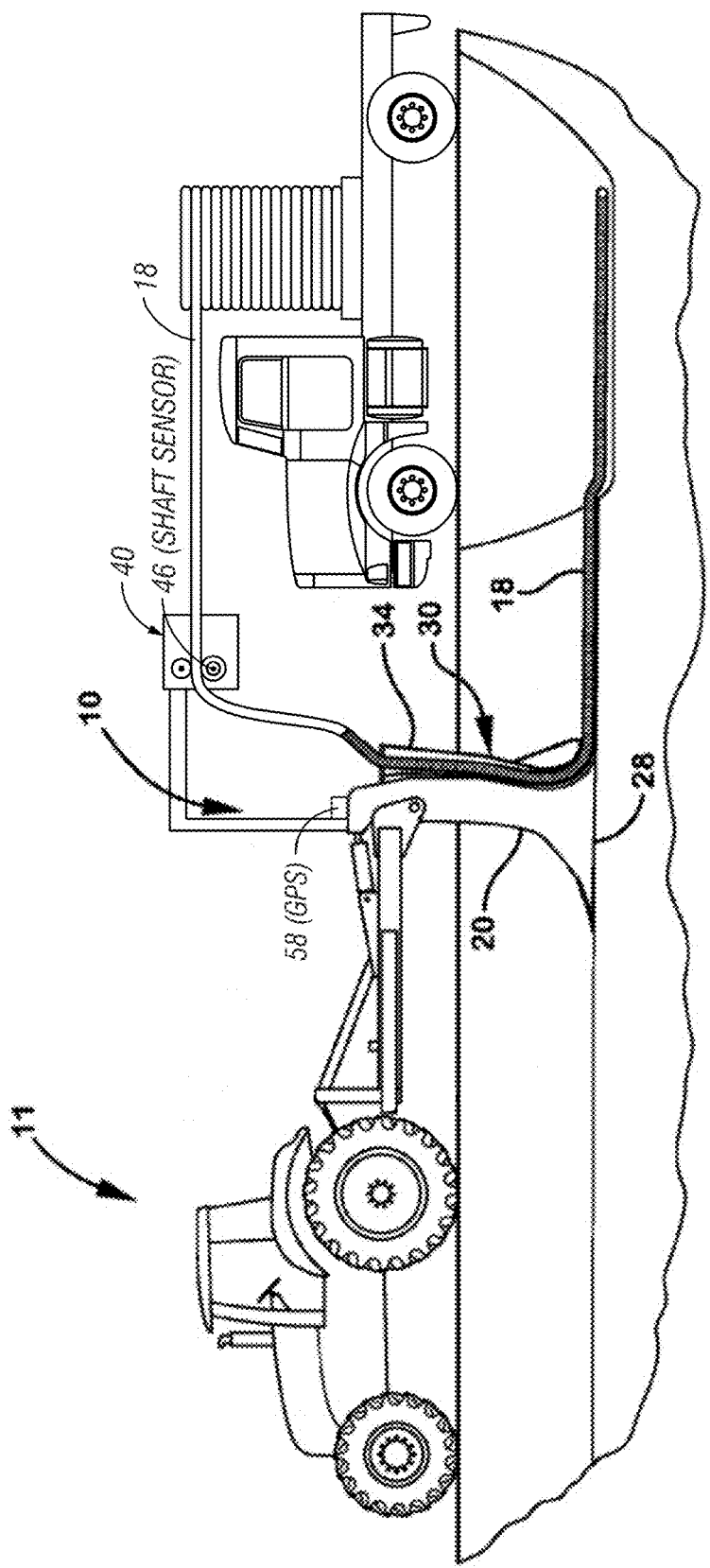
FIG. 3A is similar to FIG. 2 but modified to illustrate diagrammatically a first exemplary embodiment of the invention, allowing sensed ground speed to be matched with sensed feed motor speed to control rate of feeding of the tubing or conduit.
Figure 3B:
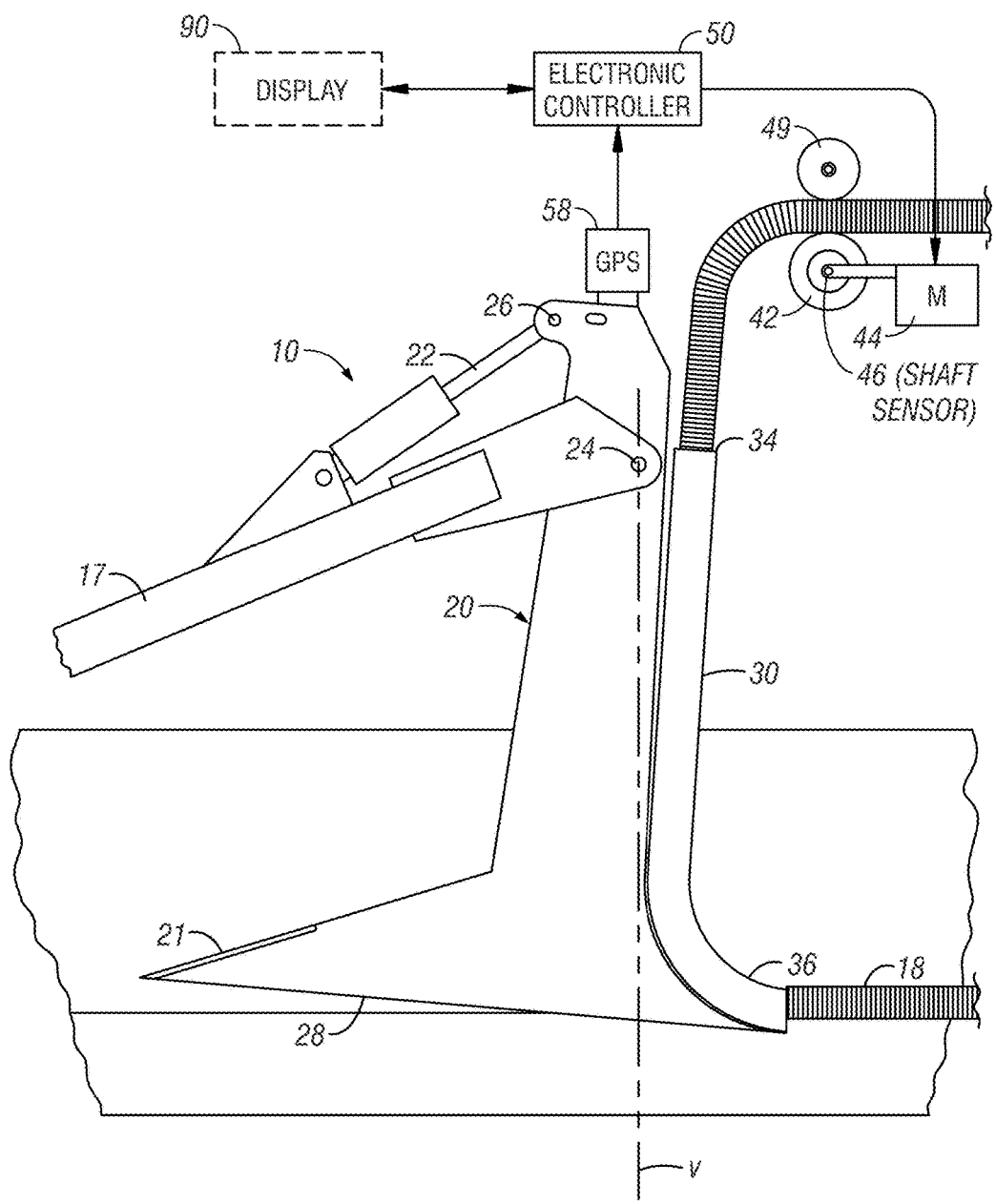
FIG. 3B is an enlarged diagrammatic view of the specific components for the motor speed control of FIG. 3A.

FIG. 3B shows diagrammatically how feeder control could be accomplished. Rotation of driven wheel 42 around its axle 43 is controlled by motor 44. As indicated in FIG. 3D, motor 44 could be a hydraulic motor. It could be tied into the hydraulic system of tractor 11.

Matching of rate of feeding of pipe 18 to the ground speed of tractor 11/plow 20/boot 30 is accomplished as follows.

A geospatial sensor such as GPS antenna 58 can be mounted at or near plow 20. Alternatively it could be mounted on tractor 11, or other parts of the tractor or plow, as all would be moving at the same speed.

Ground speed of plow 20 can be derived from GPS 58. Thus, for any chosen time frame, the predicted distance traveled by plow 20 can be calculated.

The rate of feed can be converted into length of pipe 18 as follows. Knowing the diameter of drive wheel 42, the assumption is made there is a 1-to-1 correspondence between one revolution of wheel 42 to the length of pipe 18 that is moved by wheel 42. By straightforward math, every revolution of wheel 42 can be assumed to feed a corresponding length of pipe 18 to boot 30. A sensor can monitor the number of wheel 42 revolutions for any chosen time frame.

Thus, for a common chosen time frame, sensed number of rotations of wheel 42 can be, by straight forward math, converted into a length or distance. For that same time period, sensed ground speed of plow 20 can be converted into a length or distance. By simple comparison of those two distance values, a controller 50 can be programmed to send instructions to motor 44 two automatically maintain that match, at least within some margin of error. This can promote the goal of matching the amount of pipe 18 fed to boot 38 per distance traveled.

Figure 3C:
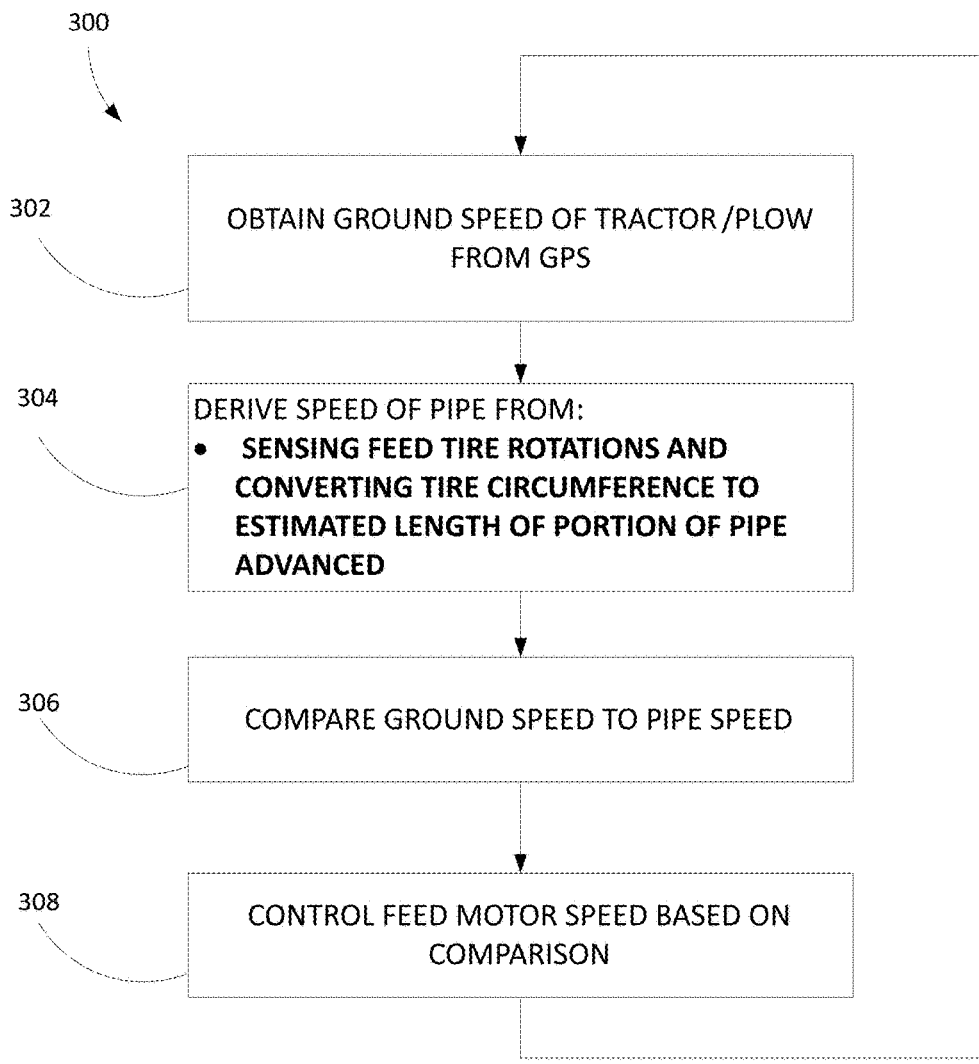
FIG. 3C is a block diagram of the methodology for controlling rate of feed with the system of FIGS. 3A-B.
Figure 3D:
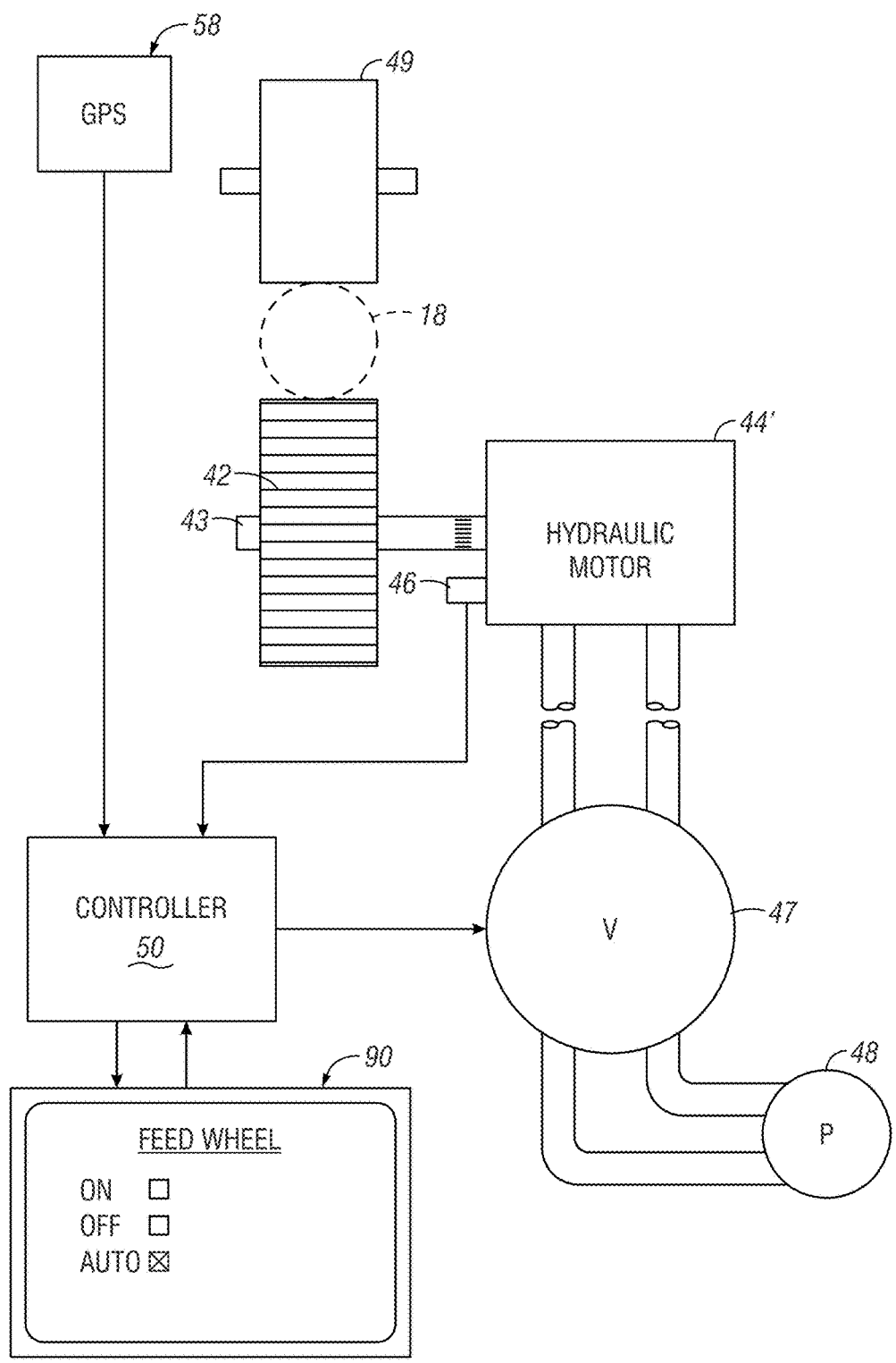
FIG. 3D is a highly diagrammatic view of a specific way to sense motor speed and control motor speed in the case of a hydraulic feed motor, such as can be used with powered feeders.

FIG. 3C shows, in simplified form, this methodology. GPS 58 is monitored to derive ground speed of the implement (step 302 of method 300). Motor speed is calibrated to correlate each revolution of wheel 42 to a presumed portion of the length of pipe 18 (step 304). Controller 50 compares distance traveled based on ground speed to the assumed the length of pipe fed based on the wheel diameter (step 306). Controller 50 instructs feed motor 44 to increase or decrease its speed to follow ground speed (step 308).

To connect to a plow tile feeder, we would need to outfit the wheel assembly with a shaft sensor, the hydraulic system with a valve (probably a PWM) that can be controlled by the display, as well as user interface (UI) work in the display (if a display is used) to enable/disable the function. It also could include a manual by-pass to allow the person that is feeding tile into the plow to use the tile feeder to help pull the tile in the boot at the start hole manually, and not require the tractor operator to turn the system on/off. This may require that there is a multi-position switch (e.g. at the top of the boot) that allows rotation each way, off, and auto (for the display to control it). To match the speed of the feed wheel to the ground speed, the system will need to know the diameter of the wheel (to calculate circumference).

Also, settings could allow a user to add a gain value so that the feed wheel is not causing drag on the tile. Wheel slip is another factor that could be adjusted by the user as needed to increase rotation speed.

FIG. 3D shows one way in which the wheel revolution speed can be monitored. Assuming the motor 44 is a hydraulic motor, it can be connected to a hydraulic system 48 such as is typically on-board existing agricultural vehicles such as tractor 11. A shaft sensor 46 can be positioned to monitor rotations of axle 43 of drive wheel 42. Such revolution sensors are well known in the art.

The diameter of wheel 42 can be translated into a circumference of wheel 42. Then, each sensed rotation of axle 43 can be converted into a length of pipe 18 assumed to have been advanced by drive wheel 42. Controller 50 can calculate this assumed distance by feedback from sensor 46 and using simple math.

Controller 50 can be programmed to repeatedly compare those length or distance values. A valve 46 could be added to the hydraulic system 48. Controller 50 can instruct feed motor 42 to speed up or slow down based on the comparison.

Valve 46 could be any of a number of commercially available hydraulic control valves. One method of control would be with pulse width modulation or PWM such as known in the art. This can give precise speed control. That control could be dynamic and automatic.

FIG. 3D also illustrates that controller 50 could communicate with a precision agricultural intelligent controller or system having a display 90. Display 90 can be a human-machine interface. It can be programmed to have a graphic user interface or GUI dedicated to operator selection of this feed control system. As illustrated in FIG. 3D, as but one example, display 90 could be called up by the operator. The operator can turn the automatic feed control on or off. The operator could also select an automatic mode whereby the system automatically controls the motor speed as described.

In this sense, directly from tractor 11, the operator could override automatic feed control or enable it. As is well appreciated by those skilled in the art, display 90 could also display data or operating parameters regarding the system. It could have other options or selectable parameters. Some of those are discussed later.

The system of FIGS. 3A-D therefore it is one way to match rate of feeder to ground speed. There is an indirect way to estimate amount of pipe 18 being fed to boot 30 per unit time as described above. Distance traveled by plow and boot 20/3030 per unit time is can be derived in a variety of ways. In this example of his through GPS. This technique converts parameters of ground speed and amount of type feed into similar units. They can be compared. By feedback to the motor 44, motor 44 can be sped up or slowed down to match the amount of pipe being fed to ground speed converted to distance traveled. Other techniques of deriving ground speed are, of course, possible. Non-limiting examples include velocimeters or inertial navigation systems. In some situations, they already exist on the tractor or vehicle.

The reason such dynamic feed control might be beneficial can vary. For example, pulling pipe 18 from its bulk reel on vehicle 13 could experience some resistance which might not only slow the ability to move it, but create stress in pipe 18. Or, the opposite could be true. The feed rate from power feeder 40 might be frustrated by resistance between it and boot 30 or between it and the ground. Still further, the tractor may slip in the field and slow down which would disrupt a 1-to-1 correspondence between ground speed and feed rate.

A further benefit of the system of FIGS. 3A-3D is the ability to use it to start and stop power feeder 40 altogether. Examples include if vehicle 11 has to stop during installation for any variety of reasons, this system could then completely stopped feed motor 44 upon sensing through GPS 58 the cessation of movement. Likewise after shutting motor 44 down, the system could be basically put to sleep. But when GPS 58 senses movement could wake up motor 44.

As can be appreciated, these semi-automatic or automatic features of the system can allow the operator to concentrate on other important tasks involved with laying drainage tile.

It has been proposed above to use a tire as a drive mechanism for advancing drainage tile into the plow and the trench it creates, and to match the tile feed rate with the forward speed of the plow to create as little stress on the tile as possible. Wheel slip in Embodiment 1 is a factor that might benefit from adjustment or compensation.

One way of doing so is to control the speed of the drive mechanism to provide the correct forward feed rate. Due to slippage of the drive wheel against the tile this will not always be accurate. It is particularly a problem when the tile becomes snagged resulting in severe slip and the tile falling behind where it needs to be.

The following methods sense the tile speed near the trench placement outlet, compare it to the speed of the tile plow itself (and the tractor pulling it), and adjust the speed of the drive wheel to the tile is dispensed at a rate matching the forward rate of the tile plow.

2. Embodiment 2

The proposed solution of this embodiment is to sense the actual speed of the tile moving forward and then adjusting the speed of the drive wheel to advance the tile at the needed rate.

The actual speed of the tile can be detected in many different ways. One way is to use an optical noncontact sensor such as the uSPEED smart sensor from Elovis (commercially available under name µ SPEED smartsensor from Elovis GmbH of Karlsruhe, Germany). Another similar device is the LaserSpeed gauge by NDC Technologies (commercially available under name LASERSPEED® from NDC Technologies, Maldon, United Kingdom). This can provide feedback to a controller that in turn adjusts the speed of the drive wheel. One disadvantage of the optical approach is that the optics must occasionally be cleaned to remove contaminants such as dust and mud.

Figure 4A:
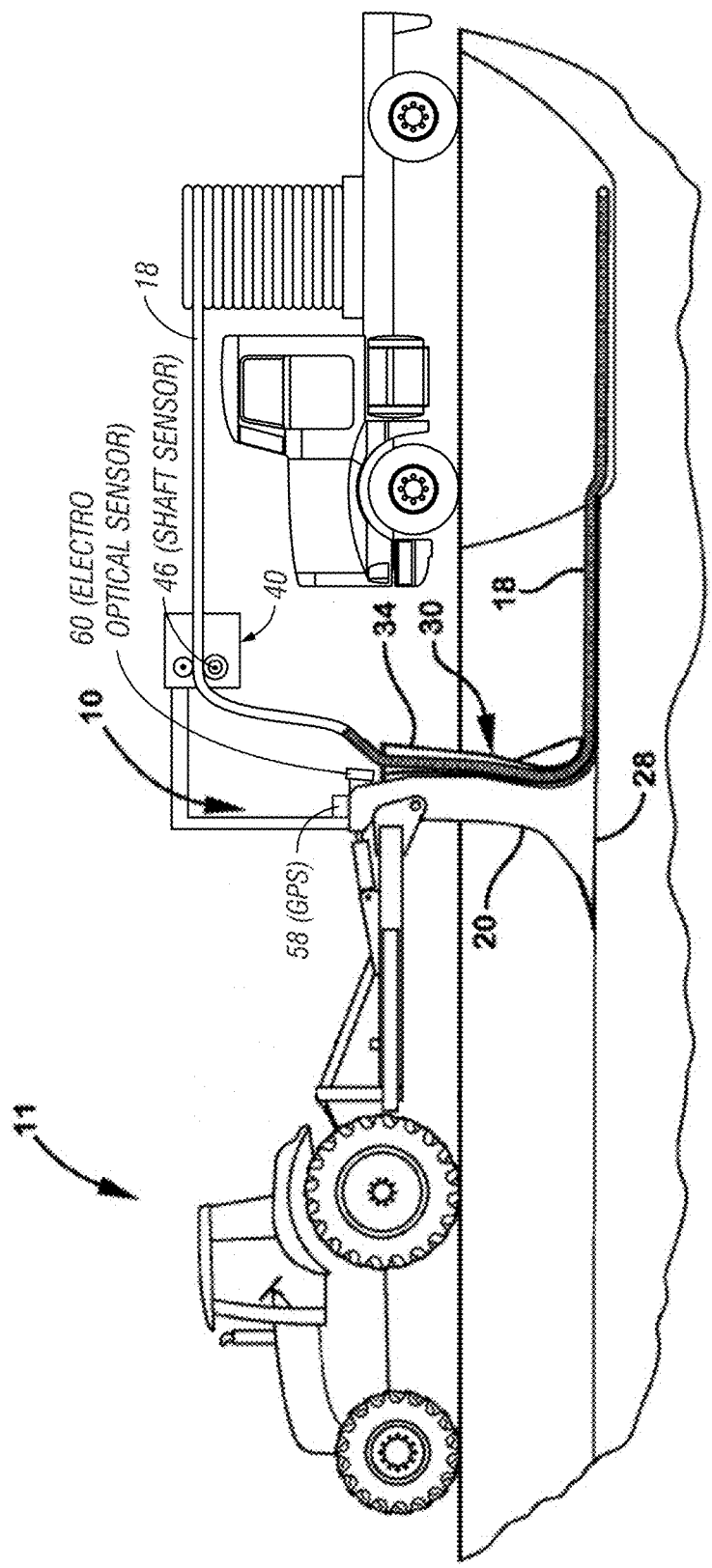
FIG. 4A is similar to FIG. 3A but modified to illustrate diagrammatically an alternative way to monitor rate of feed, in this case by an optoelectrical non-contact velocimeter to measure actual speed of movement of the tubing or conduit.
Figure 4B:
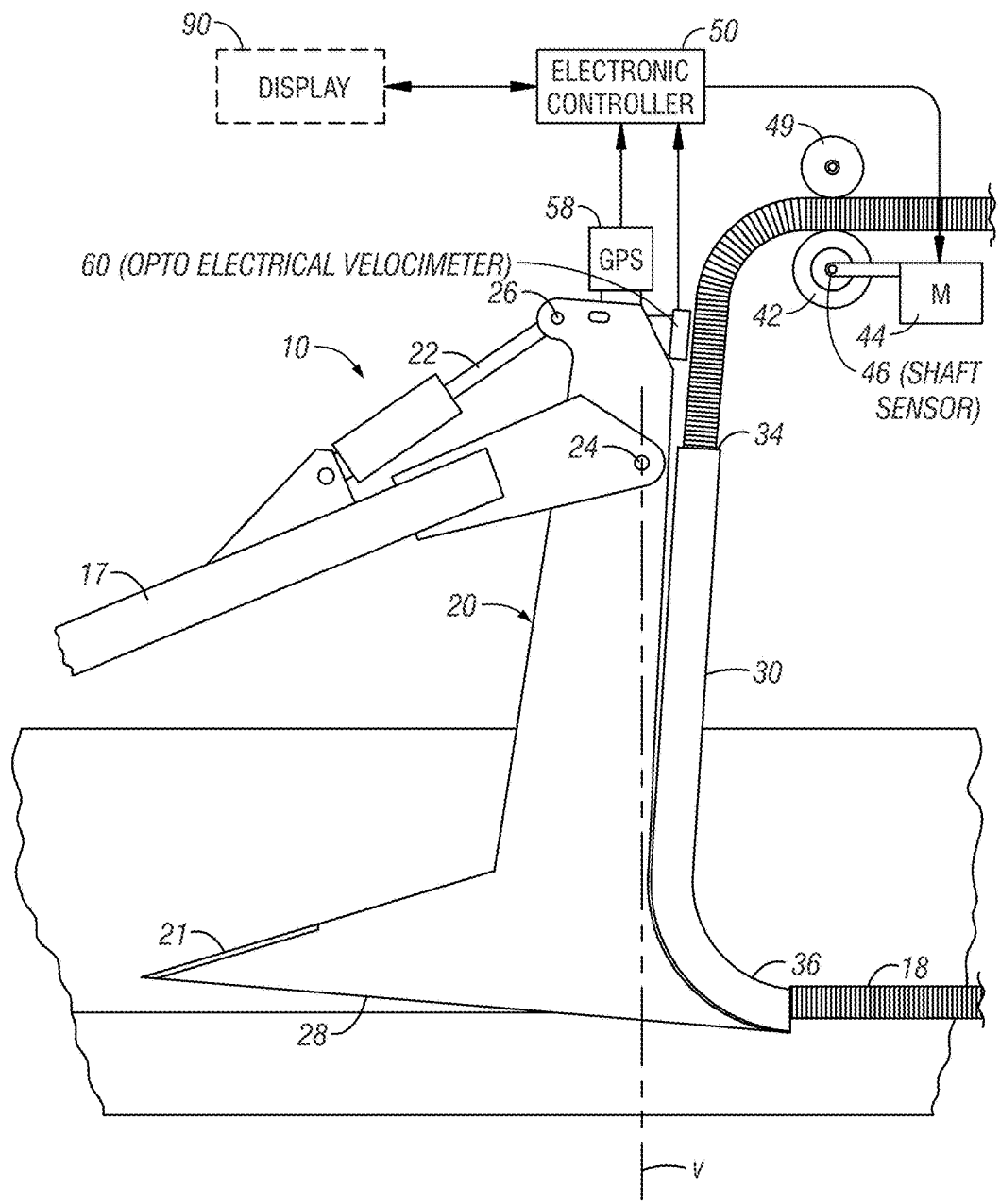
FIG. 4B is an enlarged diagrammatic view of the specific components for the motor speed control of FIG. 4A.
Figure 4C:
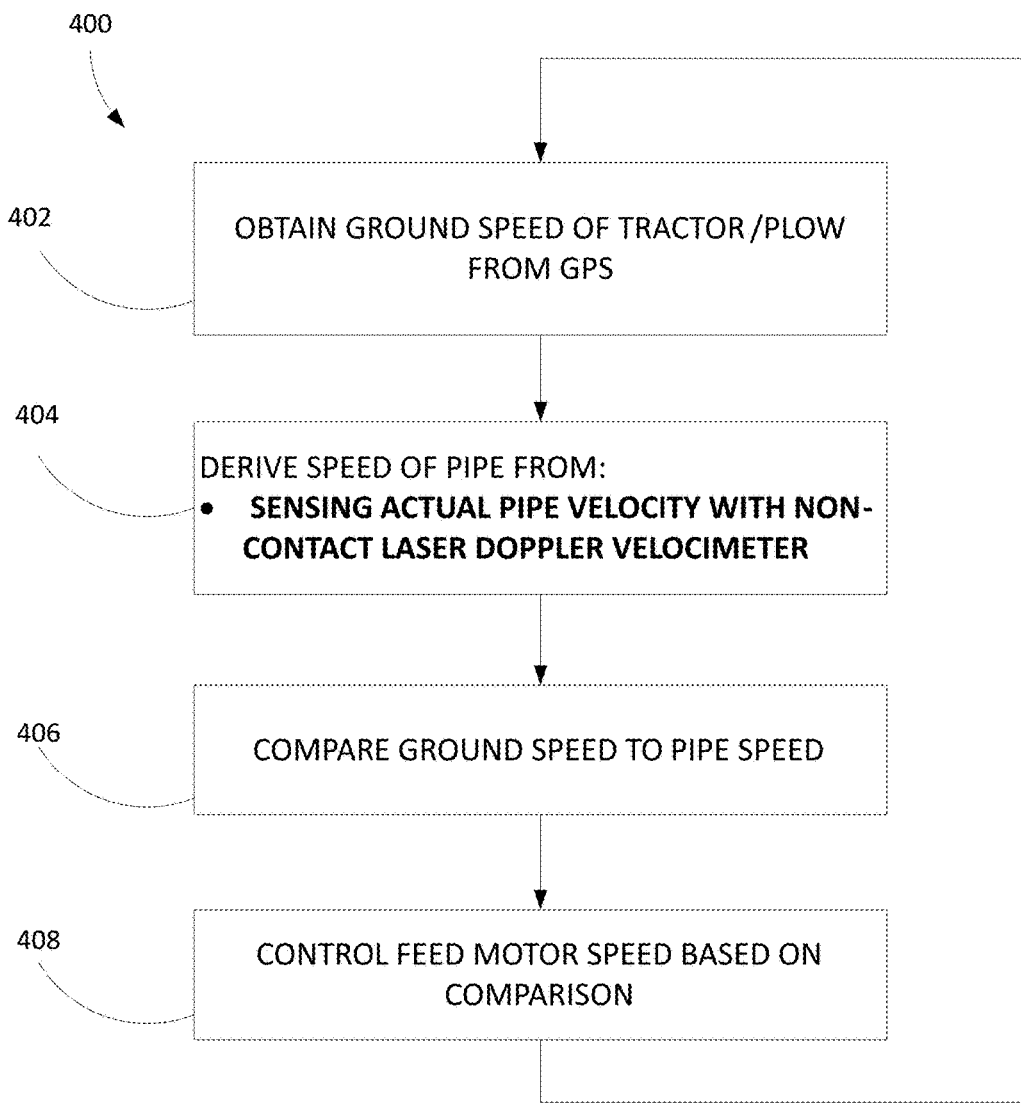
FIG. 4C is a block diagram of the methodology for controlling rate of feed with the system of FIGS. 4A-B.

FIGS. 4A-C illustrate one example of such an embodiment. It derives feed rate of tile 18 by measuring actual speed of tile 18.

The system could be similar to that of FIG. 3A with the difference being that a velocity sensor could be mounted along the path of travel of tile 18 between power feed 40 and the entry to boot 30. As shown in FIG. 4A, one such position is right at the entrance to boot 30.

In this example, the sensor is a laser sensor 60 such as discussed above. By well-known principles, it can derive speed of movement passed it and convert that into pipe velocity. By simple math, that velocity can be converted into a length per unit time. As indicated in FIGS. 4B and 4C, this noncontact measure of tile speed can be converted to a length per unit time, and then compared to distance traveled obtained by any a number of methods, including GPS ground speed measurements.

This tends to eliminate inaccuracy potential of the embodiment of FIG. 3A. That embodiment assumes a one-to-one ratio between rotation of the drive wheel and amount or length of pipe 18 advanced. However, sometimes the drive wheel slips relative pipe 18 or vice versa. This could introduce inaccuracy into the control of motor 44. Therefore, actual measurement of pipe velocity can solve inaccuracies related to slippage between drive wheel and pipe.

As indicated in FIGS. 4B and C, ground speed (step 402 of method 400) and information from the laser sensor 60 (step 404) can be communicated to controller 50. A comparison can be made (step 406). The command for any needed adjustment of the motor speed can be made by controller 50 (step 408).

The ability to communicate from the ground speed and velocimeter to a controller are within the skill of those skilled in the art. For example, the ELOVIS Non-Contact Length Gauge µ SPEED smartsensor™ mentioned above, as the following operational features: Non-contact length measurement—Laser Doppler technology optical length measurement smartsensor system. Offering a typical measurement accuracy of ±0.05% /*2) and equipped with a quatrature, pulse, RS485 and RS422 output. Processing of the measurement signals takes place in the sensor head (154×94×39mm). Gives out directly length and speed data via RS 485/RS 422 interface or pulses. All known industry bus standards as well as Ethernet are available optionally.

3. Embodiment 3

A second lower cost solution that avoids problems with occlusion of an optoelectrical velocimeter is to have the tile drive a secondary sensing wheel. See FIGS. 5A-E. This wheel would be biased against the tile at the outfeed end and could drive an encoder or other similar sensor to provide tile speed. Since the drag on this would be low, it can provide a good indication of how tile is being fed to the plow. The wheel would be biased against the tile by a spring or similar mechanism. An opposing roller would be present to prevent the tile from being pressed sideways too far.

It might be advantageous as well to have the sensing wheel having ribs that would align with the ribs on the tile. This would provide more positive engagement and sensing of the tile speed. An example is shown at FIG. 5E and discussed later.

Either technique of Embodiment 2 or this Embodiment 3 would provide an indication of tile speed. This might be communicated directly by the sensor or might be communicated by a series of pulses that the controller would sense and turn into a speed indication.

Speed could in turn be converted to length of tile placed by the simple formula distance=speed×time.

Optionally, this in turn could be used to indicate when a roll of tile was near the end and thereby alerting the operator that he needs to plan for a new roll. Non-limiting examples of an alert are a visual indicator light, an audible alarm, or a message or graphic on a display.

Determining actual amount of tile placed vs distance traversed by the plow can also be used to control the speed of the feed drive wheel. Should the tile become jammed for a period of time, the drive wheel could speed up to correct for the amount of tile that needs to be dispensed until the speed of feed and speed of travel again match.

Figure 5A:
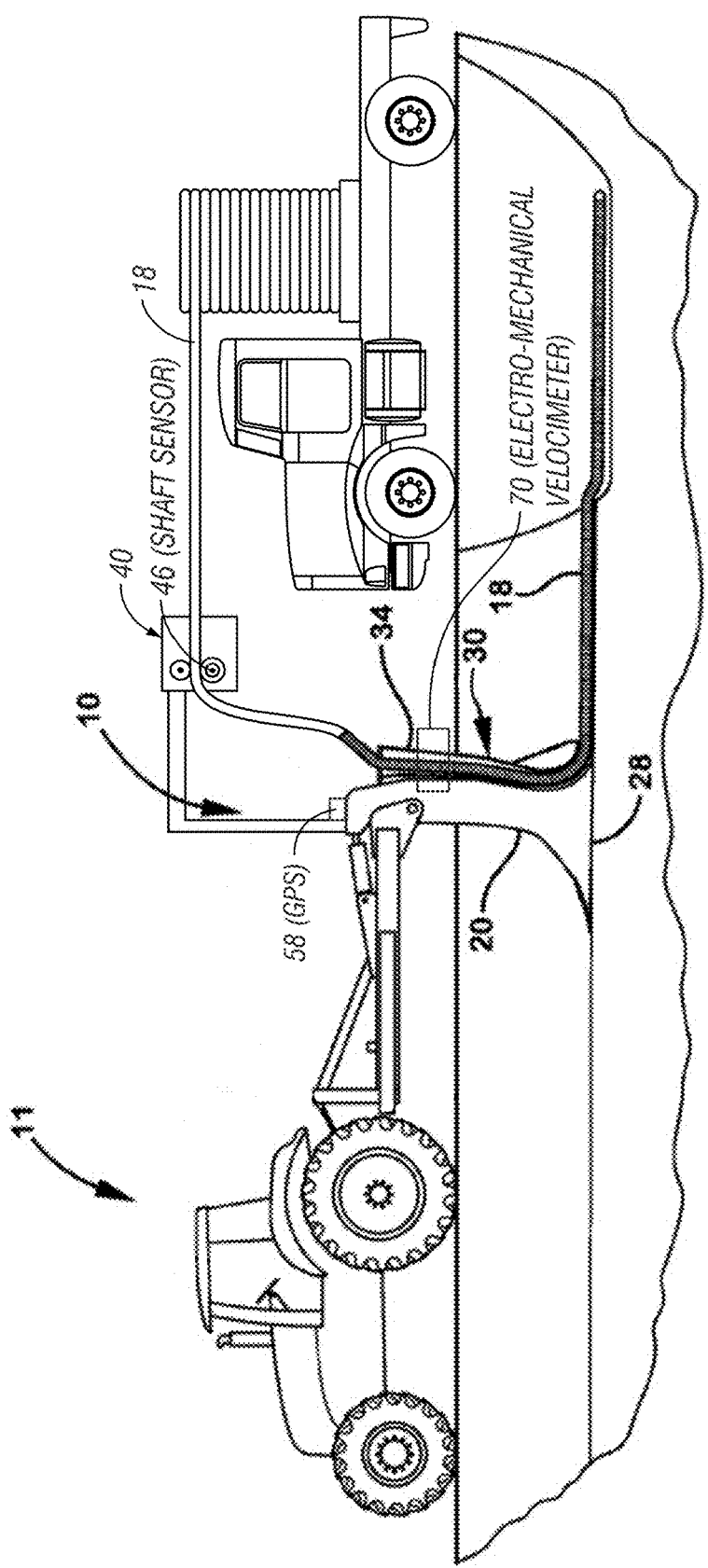
FIG. 5A is similar to FIG. 4A but illustrates diagrammatically an alternative way to directly measure actual speed of the tubing or conduit; here with a contacting electromechanical velocimeter.
Figure 5B:
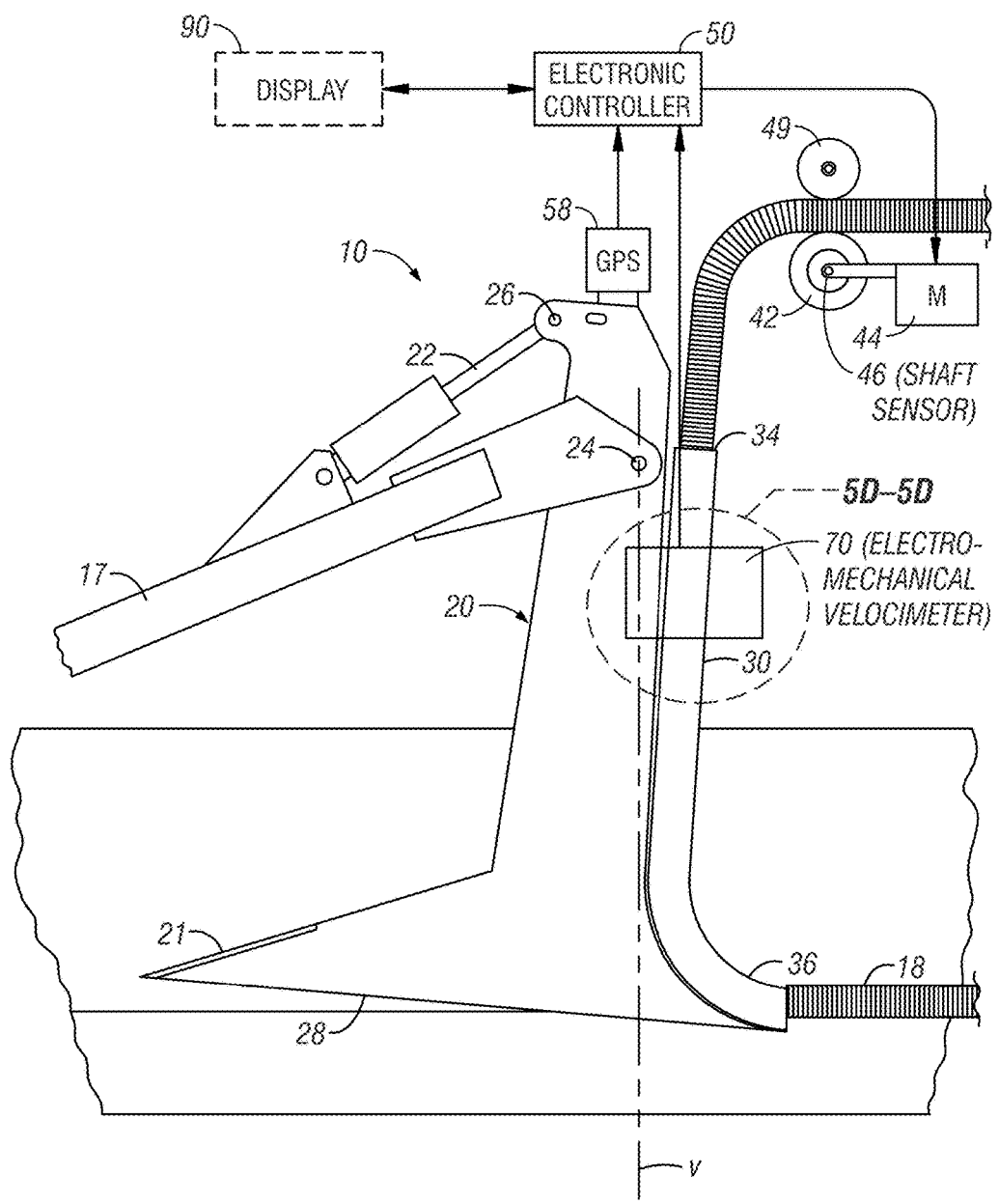
FIG. 5B is an enlarged diagrammatic view of the specific components for the motor speed control of FIG. 3A.
Figure 5C:
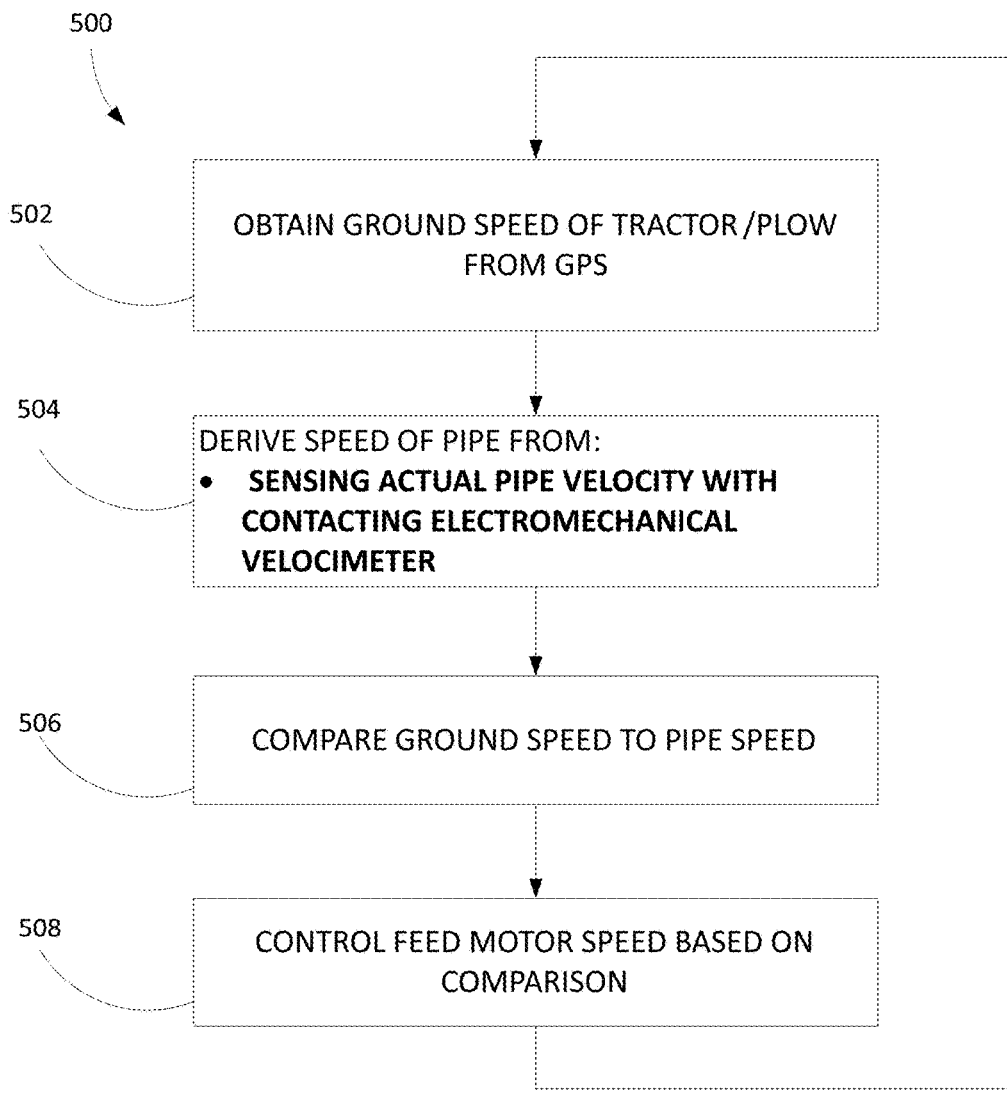
FIG. 5C is a block diagram of the methodology for controlling rate of feed with the system of FIGS. 3A-B.
Figure 5D:
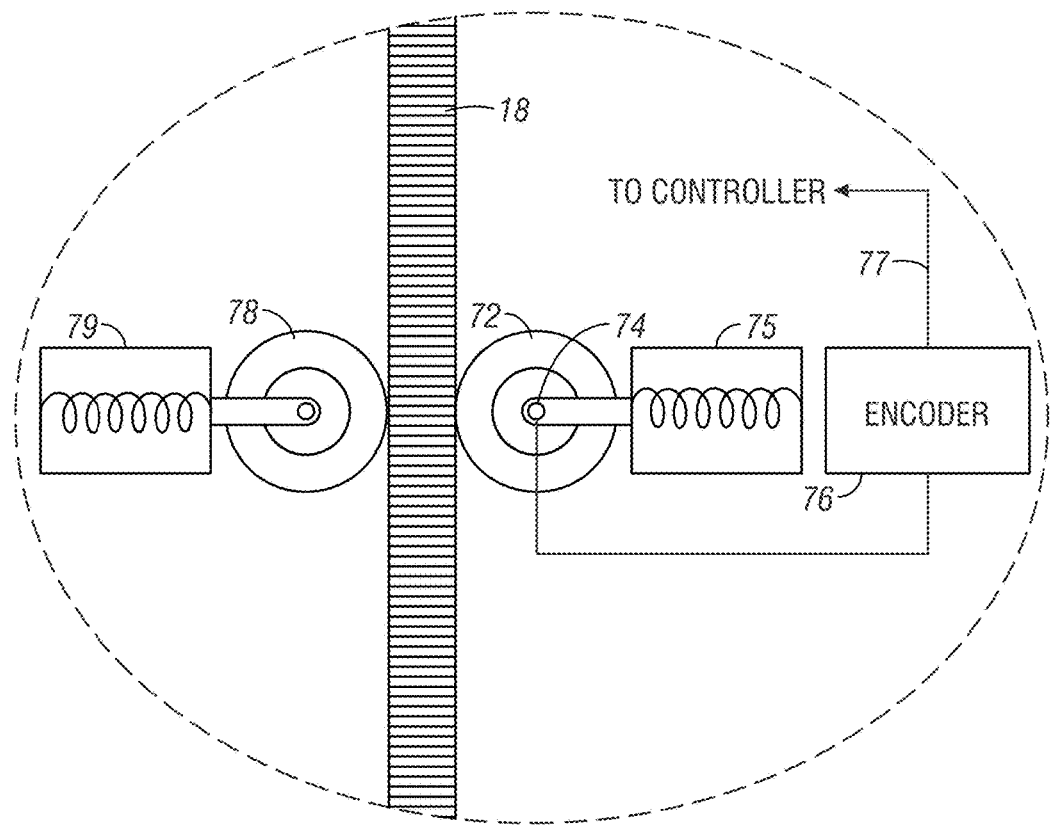
FIG. 5D is an enlarged scale and sectional diagrammatic illustration taken along reference line 5D-5D of FIG. 5B showing one specific way to configure an electromechanical contact pipe speed sensor into the plow boot.
Figure 5E:
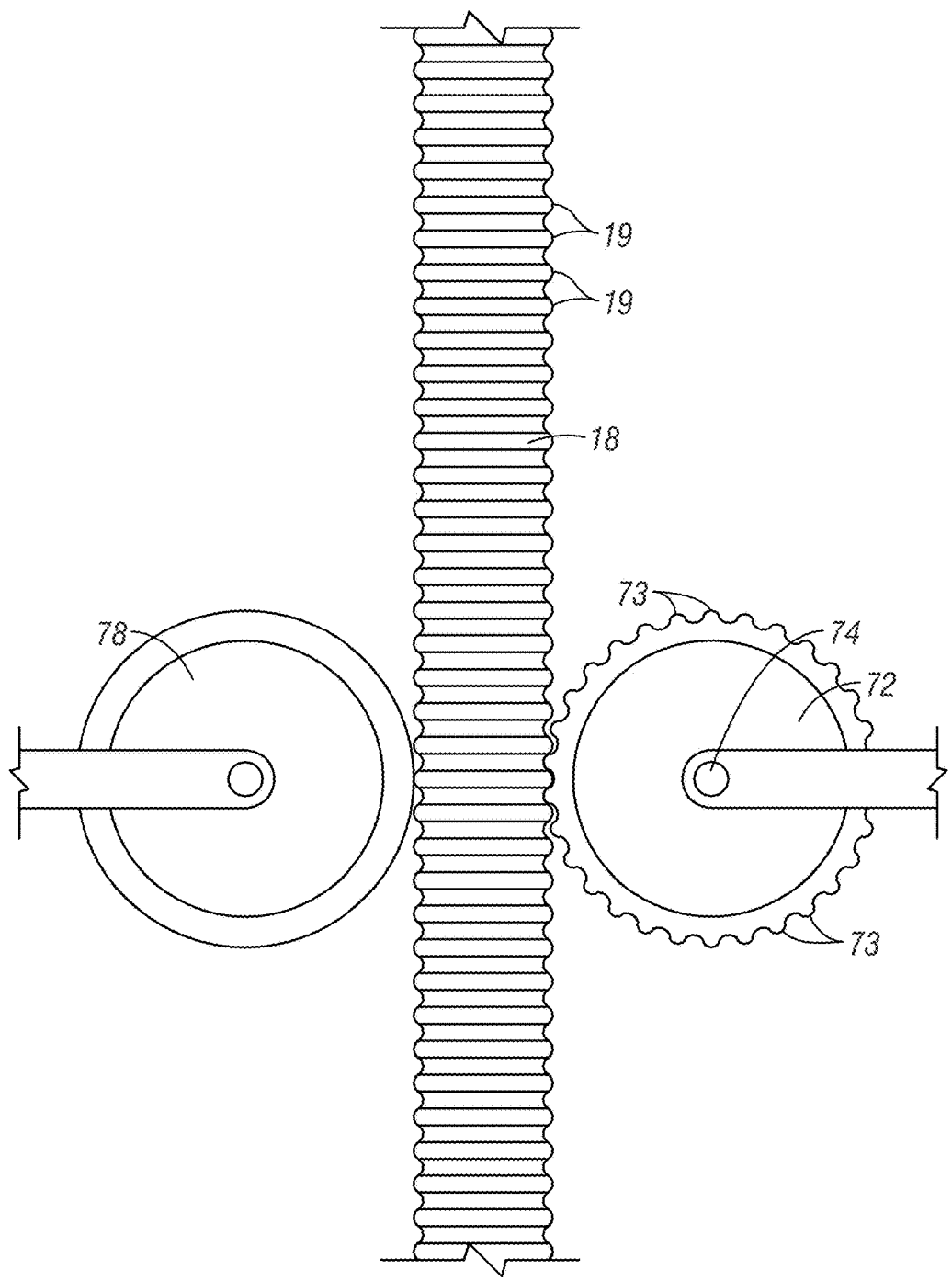
FIG. 5E is a diagrammatic illustration of an optional feature that could be used with the contact velocimeter of FIG. 5D; a feed tire having a ribbed tread to engage ribs along a flexible drainage tubing or tile, such as is known in the art.

FIGS. 5A-C show more specifics regarding this alternative to FIGS. 4A-C. Instead of a noncontact optoelectrical velocimeter, a mechanical sensor 64 with electrical encoder 66 could be used to derive actual speed of pipe 18. As shown in FIGS. 5A and B at "black box" 60, one placement could be along boot 30. FIG. 5D illustrates one possible configuration for pipe sensor 60. As shown in FIG. 5D, slots or openings could be made in opposite sides of the boot body to allow entry of a main measuring wheel 64 on one side and an optional opposite wheel 68. Some sort of biasing mechanism 65 and 69 can be used to urge each wheel 64 and 68 towards the opposite sides of pipe 18. The designer could figure out ways to suspend the wheels in those locations and the biasing members.

An encoder 66 could keep track of each revolution of main wheel 64. The encoder could be similar to the shaft sensor 46 discussed regarding FIG. 3D. Alternatively it could measure rotations directly off of wheel 64. As previously discussed, knowing the diameter of wheel 64 would allow an estimate of how much pipe 18 is passed per wheel rotation. By signal sent through electrical connection 66, encoder 66 could inform controller 50 of this measurement. Opposite wheel 68 could be used to promote good abutment of main wheel 64 to moving tile 18.

Similarly to the other embodiments, this estimation of amount of tile 18 moved per unit time (step 504 of method 500 of FIG. 5C) could be compared (step 506) to distance traveled per unit time based on ground speed (step 502). Controller 50 can be programmed to instruct feed motor 44 to speed up or slow down to match those two parameters (step 508).

Because this system relies on the assumption one revolution of measuring wheel 64 is equal to the same length of tile 18, one way to promote this happening is illustrated in FIG. 5E. The exterior tread of wheels 64 could have lateral ribs or bosses. Those ribs or bosses could be designed to promote one-to-one movement and deter slippage between wheel 64 and the ribs on corrugated pipe 18, such as is typical.

C. System

Figure 6:
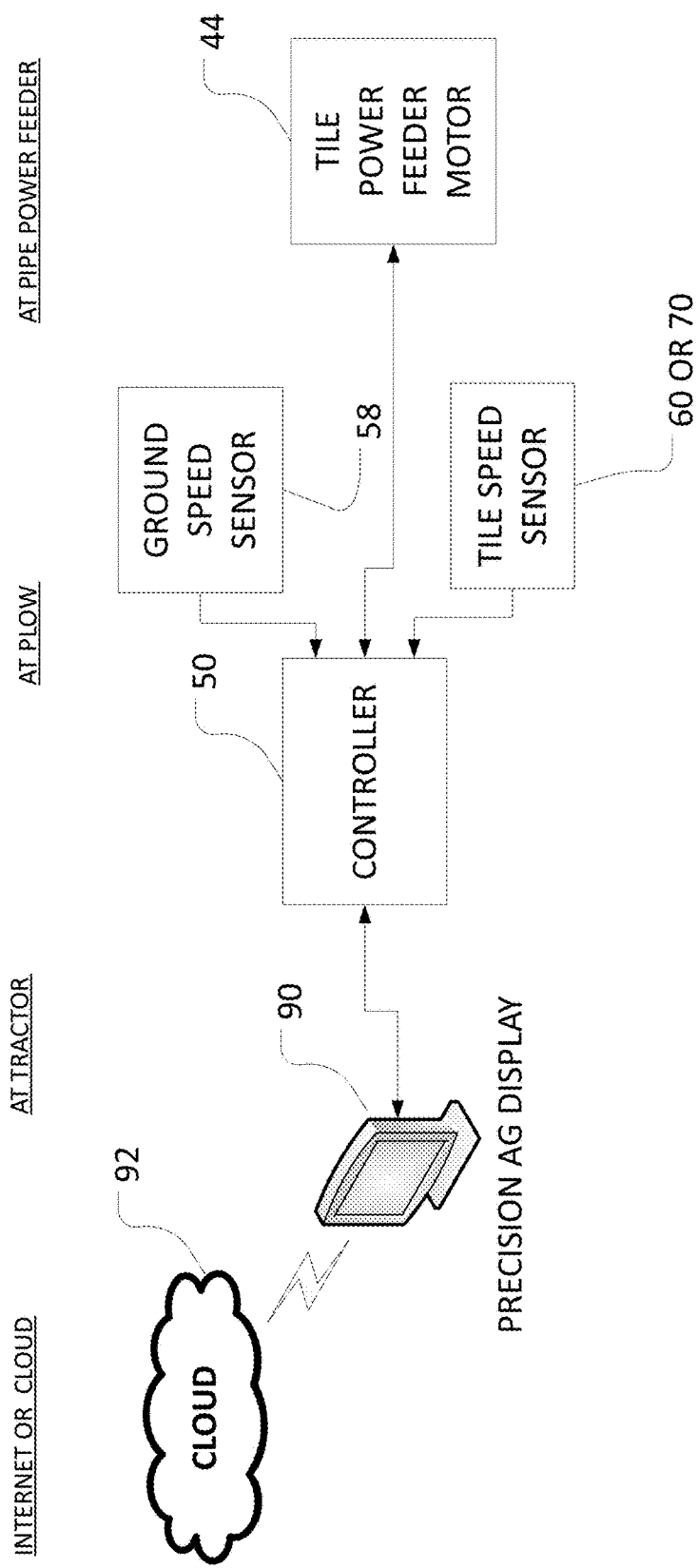
FIG. 6 is a highly schematic block diagram of an overall system such as can be used with the embodiments of the invention.

FIG. 6 illustrates how any of the embodiments could be integrated with a larger system. One example is a precision act system such as are well-known in the art. Commercially available examples include the InCommand™ Compass™ systems, including operator displays, commercially available from Ag Leader of Ames, Iowa USA.

This add-on power feed control could be integrated with such a system by at least allowing a user interface at the display dedicated to various modes or states of operation for the power feeder control. Integrating the tile laying process with these precision agricultural systems allows a number of benefits. It also can be advantageously used with a number of commercially available software programs. Examples include Intellislope™ tile control system and Auto Tile™ advanced water mad management module grade and pitch control available from Ag Leader Technologies. Survey and mapping archiving with SMS Basic or Advanced software from Ag Leader Technologies is also possible.

Additionally, as indicated in FIG. 6, any of this information could be shared or communicated to other locations. This would include remote computers such as at an agricultural producer's home, an ag manager's place of business, or otherwise. Additionally communication can be with followed for cloud-based applications.

D. Operation

The foregoing provides examples and description of how the embodiments would be used. As can be appreciated, the embodiments could be dedicated, in the sense they could be added to a tile laying plow and power feeder add-on. The ground speed and tile feed rate sensors could be added. A dedicated controller and any needed hardware to adjust feed motor speed could be added. Manually controls at the controller, or manual hardware switches or selectors could be used.

On the other hand, as discussed above, this add-on system could be integrated with other systems, including precision ag type displays and systems. In such cases, ground speed may already be available. The display can provide a human-machine interface to allow operator selection of mode or state of the tile feed motor control.

E. Options and Alternatives

It will be appreciated that in invention can take various forms of embodiments. Variations obvious to those skilled in the art will be included within the invention which is not limited by the specific embodiments disclosed herein. For example, although the embodiments focus on flexible drainage tile, the invention can be applied in analogous ways to other conduits. By further example, the specific sensors are not necessarily required so long as alternative sensors could provide the necessary information to compare feed rate versus ground speed.

By further example, the specific mounting locations, mounting structures, and ways to communicate the various components can vary according to the designer to design and need.

In the case of shaft sensors or encoders to measure and feed to the controller either feed motor speed or pipe speed (Embodiment 3), a variety of commercially-available sensors and types are available. A rotary encoder, also called a shaft encoder, is an electro-mechanical device that converts the angular position or motion of a shaft or axle to an analog or digital code. The output of incremental encoders provides information about the motion of the shaft, which is typically further processed elsewhere into information such as speed, distance and position. Examples of types of rotary encoders include: conductive, optical, on-axis magnetic, off-axis magnetic. A variety are commercially available from sources such as OMRON Industrial Automation, Osaka, Japan.

What is claimed is:

1. A method of controlling a powered feeding of flexible drainage tubing or other conduit for in-ground placement with steerable vehicle comprising:
   a. monitoring movement or speed related to a steerable vehicle; and
   b. controlling rate of the powered feeding of the tubing or conduit based on the monitored movement or speed of the steerable vehicle;
   c. wherein the placement of the tubing or conduit is with a plow and boot moved by the steerable vehicle along the ground; and the monitored movement or speed comprises movement or speed of the plow and boot along the ground;

d. wherein the controlled rate of powered feeding is by a motor rotating a wheel in abutment with the tubing or conduit;
e. wherein the controlled rate of feeding is automatically proportional to the monitored movement or speed that:
   (1) if monitored movement or speed is zero, powered feeding is stopped: (2) if monitored movement or speed is zero to a positive value, powered feeding is started; and
f. wherein if monitored movement or speed changes, powered feeding proportionally changes to substantially match rate of feeding to ground speed of the plow and boot.

2. The method of claim 1 wherein the monitored movement or speed is sensed by a GPS antenna.

3. The method of claim 1 wherein proportional changes in feeding rate is by:
   a. calibrating feed wheel diameter to linear length of tubing or conduit per feed wheel rotation;
   b. sensing speed of rotation of the feed wheel;
   c. adjusting motor speed to approximately match feed rate of linear length of tubing or conduit to sensed ground speed.

4. The method of claim 1 further comprising one or more of:
   a. providing feedback from the feed wheel, setting a gain value for the motor speed, and using the gain factor to adjust motor speed to deter the feed wheel from causing drag on the tubing or conduit;
   b. deriving a feed wheel slip factor, setting the slip factor, and using the slip factor to adjust motor speed.

5. The method of claim 1 wherein rate of the powered feeding of the tubing or conduit is based on monitoring motor speed of a motor used to rotate a feed wheel in abutment with the tubing or conduit.

6. The method of claim 1 wherein rate of the powered feeding of the tubing or conduit is based on monitored movement or speed of the tubing or conduit relative to the boot.

7. A method of controlling a powered feeding of flexible drainage tubing or other conduit for in-ground placement with a steerable vehicle comprising:
   a. monitoring movement or speed related to the steerable vehicle; and
   b. controlling rate of the powered feeding tubing or conduit based on the monitored movement or speed of the steerable vehicle, wherein rate of the powered feeding of the tubing or conduit is based on monitored movement or speed of the tubing or conduit relative to a boot along the ground;
   c. wherein the monitored movement or speed of the tubing or conduit is sensed:
      1. optoelectronically; or
      2. electromechanically; and
   d. the controlled rate of powered feeding is by a motor rotating a wheel in abutment with the tubing or conduit.

8. The method of claim 7 wherein the controlled rate of feeding is automatically proportional to the monitored movement or speed of the tubing or conduit such that:
   a. if monitored movement or speed is zero, powered feeding is stopped;
   b. if monitored movement or speed changes from zero to a positive value, powered feeding is started.

9. The method of claim 7 further comprising:
   a. if monitored movement or speed changes, powered feeding proportionally changes.

10. A method of controlling a powered feeding of flexible drainage tubing or other conduit for in-ground placement with steerable vehicle comprising:
    a. monitoring movement or speed related to the steerable vehicle; and
    b. controlling rate of the powered feeding of the tubing or conduit based on the monitored movement or speed of the steerable vehicle, wherein rate of the powered feeding of the tubing or conduit is based on monitored movement or speed of the tubing or conduit relative to the boot;
    c. further comprising:
       1. calculating length of tubing or conduit placed in the ground compared based on the monitored movement or speed,
       2. comparing the calculated length to a total supply of the tubing or conduit, and
       3. actuating an end-of-available-supply based on the comparison.

11. A method of controlling a powered feeding of flexible drainage tubing or other conduit for in-ground placement with vehicle comprising
    a. monitoring movement or speed related to the steerable vehicle; and
    b. controlling rate of the powered feeding of the tubing or conduit based on the monitored movement or speed of the steerable vehicle;
    c. wherein:
       1. the tubing or conduit comprises flexible drainage tile;
       2. the in-ground placement is associated with a precision farming system that includes one or more of:
          i. mapping of in-ground placement of the flexible drainage tile;
          ii. communication of the mapping wirelessly to a remote computer or the cloud.

12. An apparatus for controlling a powered feeding of flexible drainage tubing or other conduits system for in-ground placement comprising:
    a. a plow apparatus operably connected to a motive force to move the plow apparatus relative to a ground area, the plow apparatus comprising:
       i. a knife for creating a slot in the ground area and
       ii. a boot having an inlet, and outlet, and an intermediate section for guiding tubing or conduit into the slot;
    b. a power feeder for feeding the tubing or conduit from a bulk quantity to the inlet of the boot of the plow apparatus, the power feeder comprising:
       i. a driven wheel for abutting the tubing or conduit;
       ii. a motor for rotating the driven wheel;
    c. a sensor for sensing a parameter related to movement or speed related to the in-ground placement;
    d. a controller operably connected to the sensor and the motor of the power feeder, the controller adapted to rate of feeding of the tubing or conduit to the boot of the plow apparatus based on the sensed parameter related to movement or speed.

13. The apparatus of claim 12 wherein the parameter is movement or speed of the motive force or plow and boot relative the ground.

14. The apparatus of claim 12 wherein the sensor for sensing the parameter comprises a GPS antenna.

15. The apparatus of claim 12 wherein the parameter is movement of speed of the tubing or conduit relative the boot.

16. The apparatus of claim 15 wherein the sensor comprises an optoelectronic non-contact laser Doppler velocimeter.

17. The apparatus of claim 15 wherein the sensor comprises an electromechanical combination comprising:
   a. a contact wheel against the tubing or conduit, the contact wheel including tread that matingly engages ribbing on the tubing or conduit;
   b. an encoder to transduce velocity based on rotation of the wheel.

18. The apparatus of claim 12 further comprising one or more of:
   a. a manual bypass or override for user shut-off of the power feeder;
   b. a manual selector control for selecting direction of rotation of feeder motor, on/off, or automatic operation;
   c. a manual selector for matching speed of the feeder wheel to ground speed;
   d. a setting to allow a user to add a gain value so that the feeder wheel does not cause drag on the tubing or conduit;
   e. a setting for wheel slip factor to increase feeder wheel speed.

19. The apparatus of claim 12 wherein the controller is a stand-alone programmable controller.

20. The apparatus of claim 12 wherein the controller is associated with:
   a. a precision agricultural display and intelligent device;
   b. a remote computer;
   c. the internet;
   d. the cloud.

21. A system for controlling a powered feeding of flexible drainage tubing or other conduit for in-ground placement comprising:
   a. a plow and boot sub-system for opening a slot in the ground and guiding the tubing or conduit into the slot;
   b. a power feeder sub-system for feeding the tubing or conduit to the boot;
   c. a control sub-system for controlling rate of power feeding of the tubing or conduit to the boot comprising:
      i. a sensor for sensing a parameter related to movement or speed of one of:
         1. the plow and boot sub-system relative the ground; or
         2. the tubing or conduit relative the boot;
      ii. an electronic controller programmable to:
         1. instruct rate of feeding by the power feeder sub-system based on the sensed parameter;
   d. allowing automatic feed control of the tubing or conduit.

22. The system of claim 21 in combination with a precision ag display.

23. The system of claim 21 in combination with a tractor.

24. The system of claim 21 in combination with a supply of tubing or conduit.

* * * * *